United States Patent [19]

Phillipps

[11] Patent Number: 4,565,902

[45] Date of Patent: Jan. 21, 1986

[54] TELEPHONE CARE SYSTEM WITH SUPPLEMENTARY ALARM MESSAGE

[75] Inventor: Patrick G. Phillipps, Lincoln, Mass.

[73] Assignee: Lifeline Systems, Inc., Watertown, Mass.

[21] Appl. No.: 553,749

[22] Filed: Nov. 21, 1983

[51] Int. Cl.[4] .......................................... H04M 11/04
[52] U.S. Cl. .................................................. 179/5 R
[58] Field of Search ..................... 179/5 R, 5 P, 6.02; 340/692

[56] References Cited

U.S. PATENT DOCUMENTS

| | | | |
|---|---|---|---|
| 3,072,746 | 1/1963 | Zimmermann | 179/5 P |
| 3,531,597 | 9/1970 | Andrews et al. | 179/5 R |
| 3,549,810 | 12/1970 | Driscoll et al. | 179/5 R |
| 3,662,111 | 5/1972 | Rubinstein | 179/5 P |
| 3,700,813 | 10/1972 | Colman | 179/5 P |
| 3,842,208 | 10/1974 | Paraskevakos | 179/5 R |
| 3,987,246 | 10/1976 | Willis | 179/5 R X |
| 3,989,900 | 11/1976 | Dibner | 179/5 R X |
| 4,064,368 | 12/1977 | Dibner | 179/5 R |
| 4,284,849 | 8/1981 | Anderson et al. | 179/5 R |
| 4,371,751 | 2/1983 | Hilligoss, Jr. et al. | 179/5 R |
| 4,406,925 | 9/1983 | Jordan et al. | 179/5 P X |
| 4,417,100 | 11/1983 | Carlson et al. | 179/5 R |
| 4,438,422 | 3/1984 | Nojiri et al. | 340/692 X |

FOREIGN PATENT DOCUMENTS 2051520  1/1981  United Kingdom ............... 179/5 R

*Primary Examiner*—Keith E. George
*Attorney, Agent, or Firm*—Bromberg, Sunstein & McGregor

[57] ABSTRACT

A telephone care system enables personnel monitoring an emergency response center to be reminded that help is still needed at a given location. The system includes a provision for sending a plurality of alarm messages, wherein one criterion for selection of the message being sent is whether a message was previously sent without the alarm state thereafter having been terminated. In a preferred embodiment, a communication system in accordance with the invention includes a provision for sending repetitively, after an initial alarm message, a message to the effect that "help is still needed" until the alarm state has been terminated.

10 Claims, 2 Drawing Figures

TELEPHONE CARE SYSTEM WITH SUPPLEMENTARY ALARM MESSAGE

DESCRIPTION

1. Technical Field

The present invention relates to devices for the communication by telephone wires of information concerning the attentiveness, physical condition, need, or other circumstances of persons whose physical condition or situation may require such communication.

2. Background of the Invention

Devices of the type utilizing a plurality of communicator devices in various location to communicate by telephone with a single emergency response center are disclosed in U.S. Pat. Nos. 3,989,900 and 4,064,368, issued for inventions of Dibner, and assigned to Lifeline Systems, Inc. A communicator device of the general type to which the present invention pertains is the Lifeline model H101A communicator, which is described in the service manual that is attached to the application file and incorporated herein by reference as Exhibit 1. U.S. Pat. No. 3,662,111, issued for an invention of Rubinstein, discloses a telephone care device, for cyclically generating an alarm signal at predetermined time intervals, that will dial a predetermined telephone number to transmit a pre-recorded message in the event that a switch is not actuated within the predetermined time interval. While devices such as the Lifeline model H101A communicator provide a means for acknowledging to the response center when help has been rendered to a subscriber whose communicator has sent an alarm signal to the response center, it is possible that human error at the response center will fail to identify circumstances where an alarm signal has been received, but help has not been delivered to the subscriber.

DISCLOSURE OF INVENTION

The present invention enables personnel monitoring an emergency response center to be reminded that help is still needed at a given location. The invention includes a provision for sending a plurality of alarm messages, wherein one criterion for selection of the message being sent is whether a message was previously sent without the alarm state thereafter having been terminated. In a preferred embodiment, a communication system in accordance with the invention includes a provision for sending repetitively, after an initial alarm message, a message to the effect that "help is still needed" until the alarm state has been terminated.

BRIEF DESCRIPTION OF THE DRAWINGS

The invention will be more readily understood by consideration of the following detailed description taken with the accompanied drawings, in which.

DESCRIPTION OF SPECIFIC EMBODIMENTS

Figure 1:
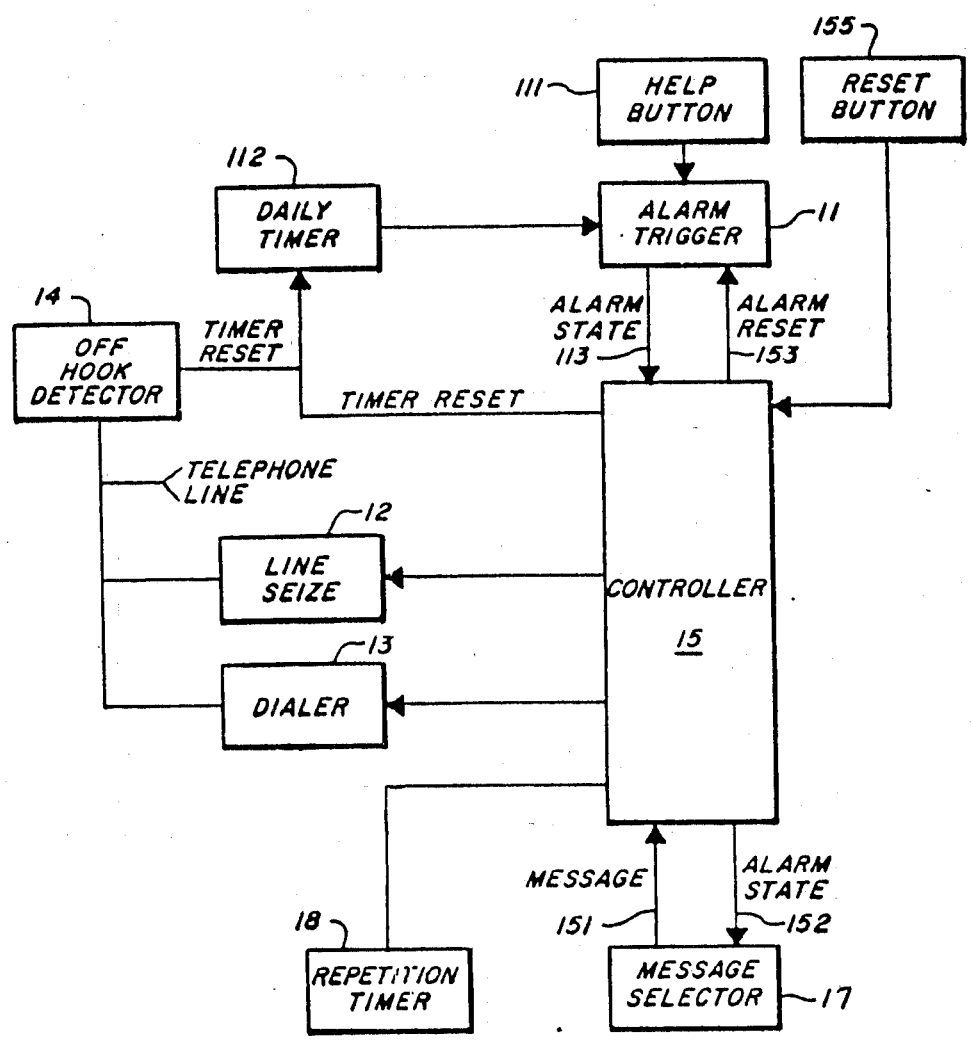
FIG. 1 is a block diagram of a preferred embodiment of a communication system in accordance with the present invention.

Referring to FIG. 1, there is shown an embodiment of the present invention. In accordance with the prior art, the controller 15, on determination that an alarm state exists, operates the line-seize 12 and dialer 13 to send an alarm message over the telephone line. The alarm state is entered by an alarm trigger 11 on suitable activation by a help button 111 or a daily timer 112. If the timer is reset before reaching the expiration of a predetermined interval of time, it will not activate the alarm trigger 11 to enter an alarm state. The reset of the timer 112 can be accomplished by the off-hook detector 14, which is connected to the telephone line, so that a subscriber who operates his telephone will cause reset of the timer. Alternatively, the daily timer 112 can be reset by a reset button 155 via the controller 15; typically, the daily timer enters a warning mode several minutes before causing the alarm trigger 11 to enter into an alarm state, and the reset button 155 can be used during this period to cause the timer 112 to be reset. If the alarm trigger 11 has entered an alarm state, the fact of which is indicated over line 113 to the controller 15, and an alarm message has been sent over the telephone line, then when assistance has been provided by a person responding to the alarm, the reset button 155 via the controller 15 can cause an alarm reset signal to go over line 153 to the alarm trigger 11, and cause termination of the alarm state. (It can be seen that the reset button 155 serves two different purposes, depending on whether the alarm trigger 11 is in an alarm state or not.) Typically when the alarm trigger 11 leaves the alarm state, the controller 15 will again activate the line-seize 12 and dialer 13 to send a message over the telephone line that help has been rendered to the subscriber.

As described thus far, the system functions in a manner similar to the known Lifeline model H101A communicator. If, however, assistance has not been rendered to the subscriber, the alarm trigger 11 will remain in an alarm state about which the controller 15 is informed over line 113. If assistance has not been rendered in an interval of time determined by repetition timer 18, the controller 15 will again operate line-seize 12 and dialer 13 to send a message over the telephone line; the message sent may differ from the initial emergency message, however, as a result of operation of the message selector 17, which selects a different message for the controller 15 to send, if the selector 17 determines over line 152 that an alarm state still exists. In such a case, the message selector 17 causes (over line 151) the controller 15 to send a message that "help is still needed" by the subscriber. The latter message is sent repetitively at intervals of time determined by the repetition timer 18 until the reset button 155 causes the alarm trigger to terminate the alarm state.

Figure 2:
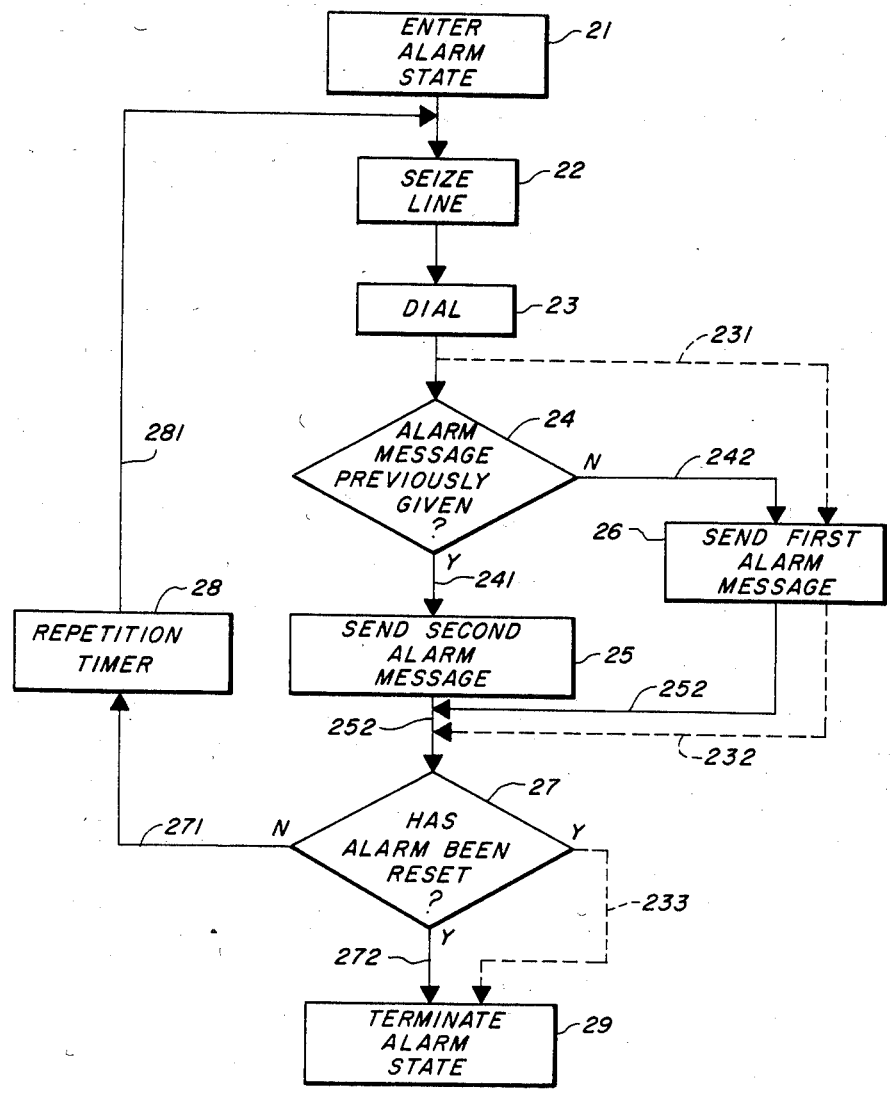
FIG. 2 is a logical diagram of operation of an embodiment of FIG. 1.

Logical operation of the system of FIG. 1 is shown in FIG. 2. Once the alarm state 21 has been entered, the system causes line-seize 22 and dialing 23. However, the alarm message 25 or 26 that is given will depend on branch 24, namely, whether an alarm message has been previously given without the system having thereafter left the alarm state. If an alarm message has not been previously given, then the decision indicated over path 242 is to deliver the basic alarm message, just as prior devices (indicated over path 231) would do. If at branch 24 it is determined that an alarm message has been previously given without the alarm state having thereafter been terminated, then logical flow is over path 241, causing delivery (box 25) of a different alarm message. Until the alarm has been reset (decision at item 27), then, after the timing of a repetition interval (box 28), the system will continue to seize the line and dial and send the second alarm message. The process stops on resetting of the alarm and termination (box 29) of the alarm state. By comparison, prior art devices will remain in the alarm state after delivery of the first alarm message (logical flow path 232) until a reset of the alarm (logical path 233), whereupon the alarm state is terminated; no differing message is sent after the first alarm message.

It will be appreciated that subsequent messages after the initial alarm message may be varied depending on either the number of previous alarm messages sent while the system has remained in an alarm state or on the interval of time that has elapsed since the system first entered into the alarm state. Thus, for example, a third message could report that help has been needed at subscriber location for three hours. It should also be noted that the central station could be used to determine whether the device at the subscriber's location has ever been reset, so that the intelligence shown with respect to the device at the subscriber's location in accordance with the present invention could be utilized entirely at the central station. That is, the central station could be configured to prompt the persons monitoring it that "help is still needed at a location" if the central station did not receive from the subscriber's communicator within a predetermined interval of time a message indicating termination of the alarm state.

Accordingly, while the invention has been described with particular reference to specific embodiments, it will be understood that it may be embodied in a variety of forms diverse from those shown and described without departing from the spirit and scope of the invention as defined by the following claims.

What is claimed is:

1. A system for communication by telephone wires of information concerning the circumstances of a subscriber, the system comprising:
   (a) line-seizing means for connecting a communicator output to the telephone wires;
   (b) dialing means for dialing a telephone number over the communicator output;
   (c) alarm means, for, in the event of a specified occurrence, entering an alarm state;
   (d) message selection means, for selecting a message from a plurality of predetermined messages, at least one criterion for selection being whether a message was previously sent without the alarm state of the alarm means thereafter having been terminated, so that a first message is selected when the system first enters an alarm state, and a second, supplementary message is selected at a specified time interval thereafter during a continuing alarm state; and
   (e) control means, activated by the alarm means and further connected to the line-seizing means, the dialing means, and the message selection means, for (i) activating the line-seizing means and the dialing means, (ii) sending a message selected by the message selection means, and (iii) causing the alarm state of the alarm means to be terminated on receipt of a reset signal.

2. A system according to claim 1, further comprising: repetition means for activating the control means repetitively until the alarm state of the alarm means has been terminated.

3. A system according to claim 2, wherein the repetition means includes means for activating the control means at predetermined intervals of time.

4. A system according to claim 3, wherein the predetermined intervals of time are uniform.

5. A system according to claim 3, wherein one of the predetermined messages is to the effect that "help is still needed".

6. A system for communication by telephone wires of information concerning the circumstances of a subscriber, the system comprising:
   (a) timing means for timing a predetermined interval of time from a beginning point established by a time reset signal input and providing an expiration signal output upon the expiration of the predetermined interval of time;
   (b) line-seizing means for connecting a communicator output to the telephone wires;
   (c) off-hook detector means connected to the telephone wires for sending an off-hook signal when a telephone circuit is in an off-hook condition;
   (d) dialing means for dialing a telephone number over the communicator output;
   (e) alarm means for, on activation by an expiration signal from the timing means or other specified occurrence, entering an alarm state;
   (f) message selection means, for selecting a message from a plurality of predetermined messages, at least one criterion for selection being whether a message was previously sent without the alarm state of the alarm means thereafter having been terminated, so that a first message is selected when the system first enters an alarm state, and a second, supplementary message is selected at a specified time interval thereafter during a continuing alarm state; and
   (g) control means, activated by the alarm means and further connected to the timing means, the line-seizing means, the off-hook detector, the dialing means and the message selection means, and having an input for receiving an initialization signal for (i) activating the line-seizing means and the dialing means, (ii) sending a message selected by the message selection means, (iii) providing a timer reset signal to the timing means on receipt of an off-hook signal from the off-hook detector means when the line-seizing means has not been activated, and (iv) causing the alarm state of the alarm means to be terminated on receipt of an initialization signal.

7. A system according to claim 6, further comprising: repetition means for activating the control means repetitively until the alarm state of the alarm means has been terminated.

8. A system according to claim 7, wherein the repetition means includes means for activating the control means at predetermined intervals of time.

9. A system according to claim 8, wherein the predetermined intervals of time are uniform.

10. A system according to claim 8 wherein one of the predetermined messages is to the effect that "help is still needed."

* * * * *